United States Patent [19]

Seed

[11] Patent Number: 4,844,689

[45] Date of Patent: Jul. 4, 1989

[54] COMPRESSOR AND AIR BLEED SYSTEM

[75] Inventor: Bernard E. Seed, Nottingham, England

[73] Assignee: Rolls-Royce plc, London, United Kingdom

[21] Appl. No.: 230,669

[22] Filed: Aug. 9, 1988

Related U.S. Application Data

[63] Continuation of Ser. No. 66,932, Jun. 26, 1987, abandoned.

[30] Foreign Application Priority Data

Jul. 4, 1986 [GB] United Kingdom ............... 8616313

[51] Int. Cl.⁴ ............................................. F01D 25/32
[52] U.S. Cl. .................................................. 415/169.1
[58] Field of Search ............................ 415/168, 121 A

[56] References Cited

U.S. PATENT DOCUMENTS

| | | | |
|---|---|---|---|
| 3,066,912 | 12/1962 | Scheper, Jr. | 415/168 |
| 3,362,155 | 1/1968 | Driscoll | 415/168 |
| 3,966,355 | 6/1976 | Pierpoline | 415/168 |
| 4,659,282 | 4/1987 | Popp | 415/177 |

FOREIGN PATENT DOCUMENTS

| | | | |
|---|---|---|---|
| 168999 | 7/1987 | Japan | 415/168 |
| 775396 | 10/1980 | U.S.S.R. | 415/121 A |
| 388156 | 12/1931 | United Kingdom | 415/168 |
| 627396 | 8/1949 | United Kingdom | . |
| 697093 | 9/1953 | United Kingdom | . |
| 701576 | 12/1953 | United Kingdom | . |
| 702773 | 1/1954 | United Kingdom | . |
| 779667 | 7/1957 | United Kingdom | . |
| 795651 | 5/1958 | United Kingdom | . |
| 936635 | 9/1963 | United Kingdom | . |
| 1028444 | 5/1966 | United Kingdom | . |
| 1145819 | 3/1969 | United Kingdom | . |
| 1310401 | 3/1973 | United Kingdom | . |
| 2149016 | 6/1985 | United Kingdom | . |
| 2172052 | 9/1986 | United Kingdom | . |
| 2172053 | 9/1986 | United Kingdom | . |

Primary Examiner—Robert E. Garrett
Assistant Examiner—John T. Kwon
Attorney, Agent, or Firm—Cushman, Darby & Cushman

[57] ABSTRACT

An air bleed system for a compressor, particularly for gas turbine engines is provided with an air bleed from a portion of the compressor to an annular chamber through an annular opening in the casing; an annular passage is connected to the opening and terminates in the annular chamber surrounding the casing; a plurality of turning vanes change the direction of flow of the bleed air by 90° to induce a circulating flow of air in the chamber; flush openings and ducts angle circumferentially in the direction of the circulating flow in the annular chambers supply air to the engine and aircraft accessories.

11 Claims, 3 Drawing Sheets

COMPRESSOR AND AIR BLEED SYSTEM

This is a continuation of application Ser. No. 066,932, filed June 26, 1987, which was abandoned upon the filing hereof.

The present invention relates to compressors of gas turbine engines, and is particularly concerned with air bleed systems on the compressor.

The compressor or compressors of a gas turbine engine are used as a source of high pressure air for cooling of the turbines, bearings and gears of the gas turbine engine, and also in the case of an aero gas turbine engine the high pressure air may be supplied to a cabin of an associated aircraft.

One prior art device for bleeding air from the compressor comprises a number of circumferentially arranged bleed ports in the casing of the compressor which bleed air from the compressor and supply the air radially into a circular cross section manifold which encircles the compressor casing. In this arrangement the bleed air flows radially into the manifold, and flows through the manifold to axial outlet ducts to the engine accessories. The bleed ports have to be arranged uniformly around the casing and may have to be of different sizes to ensure uniform flow through each bleed port to prevent maldistribution of air and compressor surge.

One of the problems of bleeding relatively large amounts of air from the compressor of the gas turbine engine, is that most of the dynamic pressure of the air is lost when the air is bled radially from the compressor because of the limitations of space between adjacent stages of blades conflicting with the requirements for good recovery of pressure.

A further prior art device in UK patent application GB2149016A, discloses a tip compressor which is formed by outer aerofoils secured to a shroud and inner aerofoils which form a fan of a gas turbine engine. The shroud divides the airflow into a bleed air flow and an air flow through the gas turbine engine. The bleed air flows axially from the tip compressor through outlet guide vanes to an annular collecting manifold, from where the bleed air is used for VTOL or STOL purposes. The bleed flow is very large and is not taken from the compressor of the gas turbine engine.

The invention seeks to provide a compressor in which the air bleed system has reduced pressure losses.

Accordingly the present invention provides an axial flow compressor comprising at least one stage of rotor blades arranged circumferentially on and extending radially outwards from a rotor, a casing surrounding and spaced from the rotor, the casing having an opening for bleeding air from the radially outermost region of the axial compressor in an axial direction and supplying the bleed air to an annular chamber extending circumferentially around the casing, air turning means are arranged to change the direction of flow of the bleed air by substantially 90° whereby a circulating flow of air is formed in the annular chamber to reduce pressure losses in the bleed air, at least one outlet opening being provided in the annular chamber for supplying bleed air to accessories.

The annular chamber may be of constant cross-sectional area.

The opening in the casing may be annular.

The turning means may comprise a plurality of circumferentially arranged vanes arranged in an axially extending passage between the opening and the annular chamber.

The opening in the casing may be formed radially between a first casing portion and a second casing portion, the downstream end of the first casing portion being positioned radially outwards of the upstream end of the second casing portion.

The opening in the casing may be formed axially between a first casing portion and a second casing portion.

The annular chamber may have a circular cross-section.

The at least one outlet opening supplying bleed air through ducting, the ducting being angled in the direction of flow of the circulating air in the annular chamber.

The accessories may comprise turbines, bearings gears etc. on a gas turbine engine.

The accessories may comprise a cabin air system of an associated aircraft.

The invention will be more fully described by way of example with reference to the accompanying drawings, in which.

Figure 1:
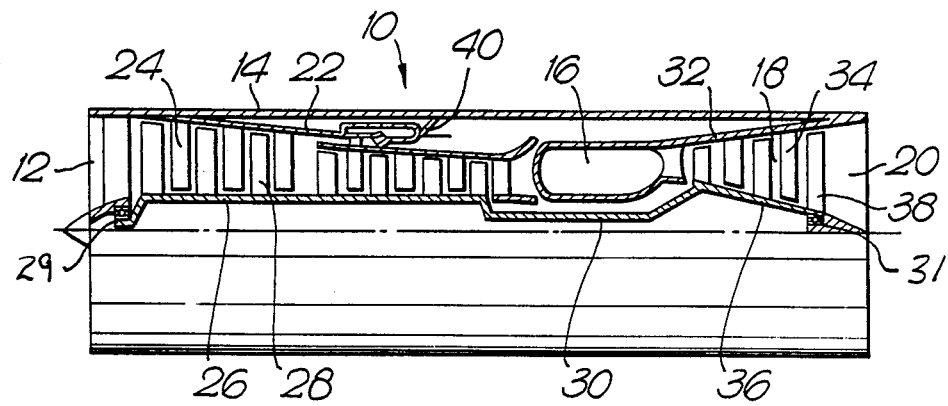
FIG. 1 is a partially cut-away view of a gas turbine engine showing a compressor according to the present invention.

A gas turbine engine 10, is shown in FIG. 1 and, comprises in flow series an inlet 12, a compressor 14, a combustion system 16, a turbine 18 and an exhaust nozzle 20. The compressor 14 comprises a rotor 26 which carries a plurality of stages of rotor blades 28, each of the stages of rotor blades are arranged circumferentially on the rotor and extend radially outwardly therefrom. A casing 22 is spaced radially from and surrounds the rotor 26 and rotor blades 28, and the casing 22 supports a plurality of stages of stator vanes 24. Each of the stages of stator vanes are arranged circumferentially on the casing and extend radially inwardly therefrom. The stages of rotor blades and stator vanes are arranged axially alternately.

The turbine 18 also comprises a turbine rotor 36 which has a plurality of stages of turbine rotor blades 38, each of the stages of turbine blades are arranged circumferentially on and extend radially from the turbine rotor. A turbine casing 32 is spaced radially from and surrounds the turbine rotor 36 and turbine blades 38, and a plurality of stages of turbine stator vanes 34 are supported from the turbine casing. The turbine stator vanes are arranged circumferentially on the casing and extend radially inwardly therefrom. The stages of turbine vanes are arranged axially alternately.

The turbine rotor 36 and compressor rotor 26 are interconnected by a shaft 30 which enables the turbine rotor to drive the compressor rotor.

The gas turbine engine 10 works conventionally, in that air is compressed by the compressor and is supplied into the combustion system. Fuel is injected into the combustion system and is burnt in the air to produce hot gases which flow through and drive the turbine. The turbine in turn drives the compressor via the shaft.

A bleed system 40 is also provided on the compressor 14 of the gas turbine engine 10 to enable a portion of the compressed air to be removed from the compressor 14. The portion of compressed air may be used for cooling of the turbines, bearings 29, 31 and gears of the gas turbine engine, or it may also be supplied, in the case of an aero gas turbine engine, to a cabin of an associated aircraft, or other engine or aircraft accessories.

Figure 2:
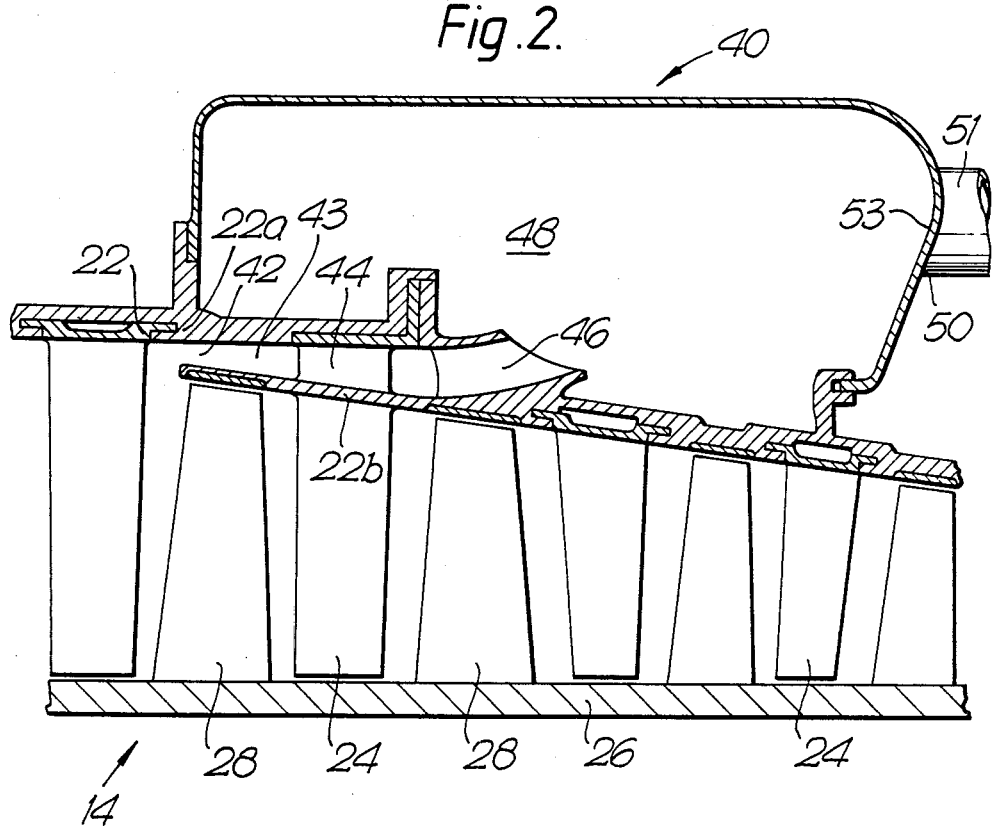
FIG. 2 is an enlarged section of the compressor in FIG. 1 showing an air bleed system according to the invention.

The bleed system 40 is shown more clearly in FIG. 2, and comprises an annular opening 42 which is formed radially between a first upstream portion 22a and a second downstream portion 22b of the casing 22. The opening 42 is positioned at the radially outermost region of the compressor to bleed off a portion, approximately 7% but up to 10%, of the air flow through the compressor. The bleed air flows through axially extending annular passage 43, through vanes 44 and an air turning means 46, which comprises a stage of circumferentially arranged vanes to an annular chamber 48. The annular passage 43, vanes 44 and turning vanes 46 are positioned between the first and second portions of the casing.

The air turning vanes 46 change the direction of flow of the bleed air by substantially 90°, discounting swirl in the bleed flow, so that the bleed air is directed to flow circumferentially in the annular chamber 48 which extends circumferentially around the casing, and thus a circulating flow of air is formed in the annular chamber.

The annular chamber 48 is formed by the casing portions 22a and 22b on its radially inner side and by a wall 50 on its radially outer side. The wall 50 is provided with one or more circumferentially arranged flush openings 53 and associated ducts 51, which are angled circumferentially in the direction of flow of the circulating air in the annular chamber 48, to supply bleed air for cooling of the turbine, bearings, gears or for an aircraft cabin or other engine or aircraft accessories. The ducts are provided with bleed valves (not shown) to control the flow of air to the accessories.

The annular chamber 48 is of constant area, and the circulating flow in the annular chamber produces a near uniform pressure distribution in the annular chamber. The circulating flow is considerably larger than the bleed flow and is induced by the bleed flow.

The bleeding of air axially from the compressor, and turning it through 90° into the annular chamber, where a circulating flow is produced ensures that the dynamic pressure of the air bled from the compressor is not lost. This results in an increase of engine performance compared to the prior art bleed system and can be considered as a decrease in the specific fuel consumption (SFC), a thrust gain, or lower drag of the gas turbine engine.

The prior art compressor bleed system does not use the dynamic pressure of the compressor air and there are other pressure losses at the bleed ports into the manifold and outlets to the accessories.

The bleed system is particularly beneficial in situations where the bleed air flow requirements for the various accessories are variable or non existent under some conditions, as maldistribution problems and energy losses in the compressor associated with the prior art bleed system are prevented because of the uniform pressure in the annular chamber. The pressure in the annular chamber remaining uniform no matter which accessories are supplied, or not supplied, with air.

Figure 3:
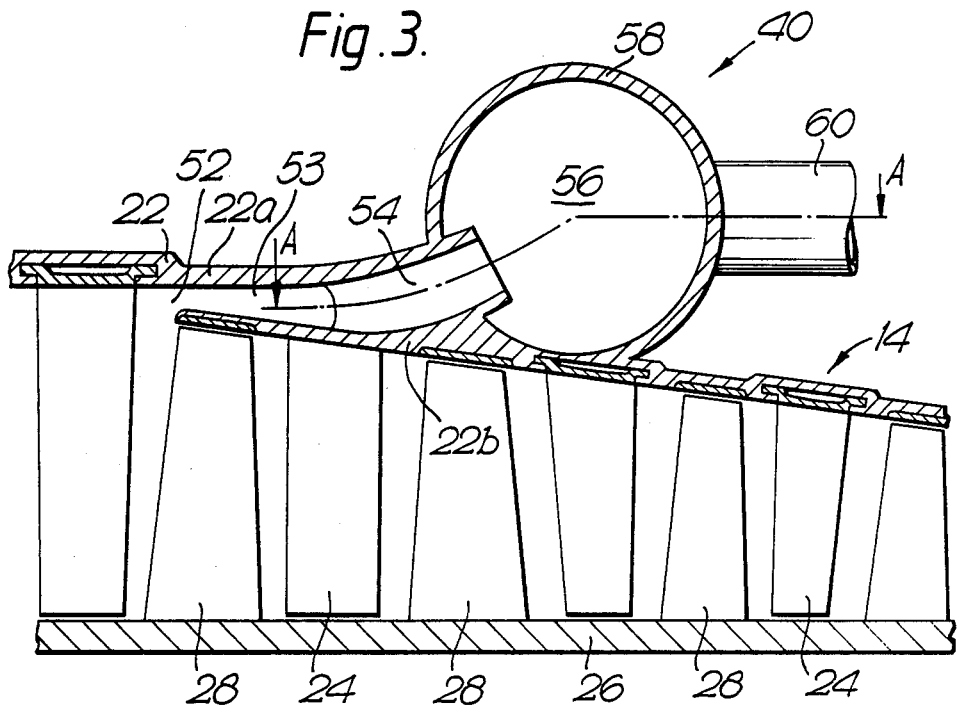
FIG. 3 is an alternative embodiment of the compressor air bleed system according to the invention.
Figure 4:
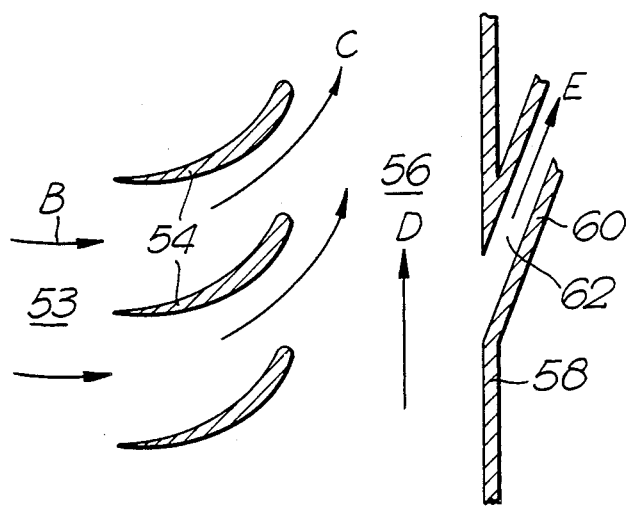
FIG. 4 is a sectional view along line A—A in FIG. 3.

A second embodiment of the bleed system 40 is shown in FIGS. 3 and 4, and comprises an annular opening 52 formed radially between the first portion 22a and the second portion 22b of the casing 22. The opening 52 is positioned at the radially outermost region of the compressor and bleeds off a portion of the air flow through the compressor. The bleed air B flows through axially extending passage 53 and turning vanes 54 to the annular chamber 56.

The turning vanes 56 again change the direction of flow of the bleed air by substantially 90° so that the bleed air is directed to flow circumferentially C in the annular chamber 56 to produce a circulating flow of air D in the annular chamber.

The annular chamber 56 is of constant area and is of substantially circular cross-section and is formed by member 58. The member 58 has one or more flush openings 62 and associated ducts 60 arranged circumferentially, which are angled circumferentially in the direction of flow of the circulating flow D to supply air E for accessories.

Figure 5:
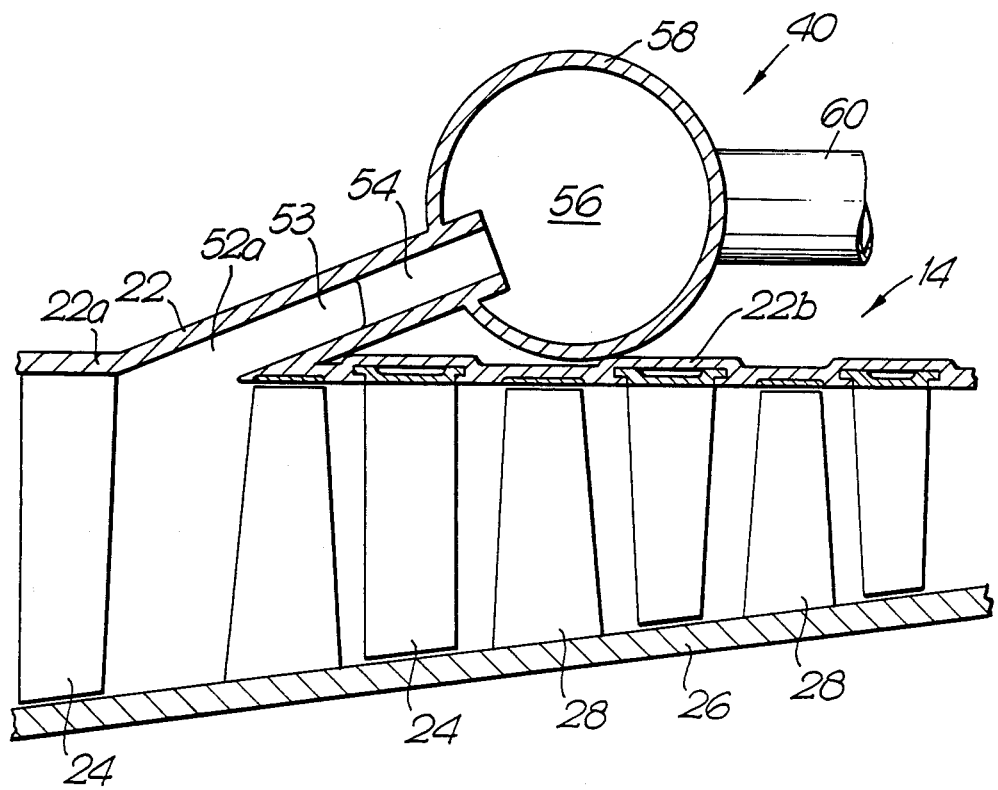
FIG. 5 is a third embodiment of the compressor bleed system according to the invention.

A third embodiment of the bleed system in shown in FIG. 5, and is substantially the same as the embodiment in FIGS. 3 and 4, but differs in that an annular opening 52a is formed axially between and flush with the casing portions 22a and 22b. The bleed system works the same as the previous embodiments. This arrangement is particularly useful for use in a low pressure compressor or at the low pressure upstream end of a compressor. There is a possibility of ice or foreign objects entrained in the compressed air passing with the bleed flow into the annular openings to the bleed system in the previous embodiments, whereas in this embodiment the possibility of ice or foreign objects flowing into the annular opening is reduced because the annular opening is formed flush with and axially between the casing portions and not formed radially between the casing portions.

The invention is shown applied to a single spool gas turbine engine in FIG. 1, but may also be applied to a two or three spool gas turbine engine.

The gas turbine engine in FIG. 1 may form the core engine of a turbofan gas turbine engine, particularly a rear fan arrangement with one or more fans, or a turbopropeller gas turbine engine, particularly a pusher propeller arrangement with one or more propellers. The invention is particularly applicable to these core engines as the core engines are relatively small and any reduction in losses in the bleed system is beneficial to the engine performance.

I claim:
1. An axial flow compressor comprising a rotor and a casing,
the rotor having at least one stage of rotor blades, the rotor blades being arranged circumferentially on and extending radially outward from the rotor,
the casing surrounding and being spaced from the rotor, the casing having an opening for bleeding air from the radially outermost region of the axial flow compressor in an axial direction,
an annular chamber extending circumferentially completely around the casing and defining an unobstructed annular passage, an axially extending passage supplying the bleed air from the opening in the casing to the annular chamber, air turning means being arrange in the axially extending passage, the air turning means being arranged to change the direction of flow of the bleed air, the air turning means being arranged to each direct the bleed in the same circumferential direction whereby a circulating flow of air is formed in the annular cham- ber to reduce pressure losses in the bleed air, the annular chamber having at least one outlet opening for supplying bleed air through ducting to accessories, the ducting being angled in the direction of flow of the circulating air in the annular chamber.

2. An axial flow compressor as claimed in claim 1 in which the annular chamber is of constant cross-sectional area.

3. An axial flow compressor as claimed in claim 1 in which the opening in the casing is annular.

4. An axial flow compressor as claimed in claim 1 in which the turning means comprises a plurality of circumferentially arranged vanes.

5. An axial flow compressor as claimed in claim 1 in which the casing comprises a first casing portion and a second casing portion, the first casing portion having an upstream end and a downstream end, the second casing portion having an upstream end and a downstream end, the downstream end of the first casing portion being positioned radially outwards of the upstream end of the second casing portion, the opening in the casing being formed radially between the first casing portion and the second casing portion.

6. An axial flow compressor as claimed in claim 1 in which the casing comprises a first casing portion and a second casing portion, the opening in the casing is formed axially between the first casing portion and the second casing portion.

7. An axial flow compressor as claimed in claim 1 in which the accessories comprise turbines, bearings, of a gas turbine engine.

8. An axial flow compressor as claimed in claim 1 in which the annular chamber has a circular cross-section.

9. A gas turbine engine comprising an axial flow compressor, the axial flow compressor comprising a rotor and a casing, the rotor having at least one stage of rotor blades, the rotor blades being arranged circumferentially on and extending radially outwards from the rotor, the casing surrounding and being spaced from the rotor, the casing having an opening for bleeding air from the radially outermost region of the axial flow compressor in an axial direction an annular chamber extending circumferentially around the casing, an axially extending passage supplying the bleed air from the opening in the casing to the annular chamber, air turning means being arranged to change the direction of flow of the bleed air by substantially 90° whereby a circulating flow of air is formed in the annular chamber to reduce pressure losses in the bleed air, the annular chamber having at least one outlet opening for supplying bleed air to accessories.

10. A gas turbine engine as claimed in claim 9 in which the gas turbine engine is a turbofan.

11. A gas turbine engine as claimed in claim 9 in which the gas turbine engine is a turbopropeller.

* * * * *